(12) United States Patent
Nakano

(10) Patent No.: US 10,223,814 B2
(45) Date of Patent: Mar. 5, 2019

(54) INFORMATION PROCESSING APPARATUS, IMAGE RECONSTRUCTION METHOD, AND COMPUTER-READABLE MEDIUM

(71) Applicant: CANON KABUSHIKI KAISHA, Tokyo (JP)

(72) Inventor: Kota Nakano, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 151 days.

(21) Appl. No.: 15/363,491

(22) Filed: Nov. 29, 2016

(65) Prior Publication Data

US 2017/0161923 A1 Jun. 8, 2017

(30) Foreign Application Priority Data

Dec. 3, 2015 (JP) .................................. 2015-236712

(51) Int. Cl.
*G06T 11/00* (2006.01)
*G06T 3/40* (2006.01)

(52) U.S. Cl.
CPC .......... *G06T 11/006* (2013.01); *G06T 3/4007* (2013.01); *G06T 2207/10081* (2013.01); *G06T 2207/20021* (2013.01); *G06T 2211/424* (2013.01)

(58) Field of Classification Search
CPC ................. G06T 11/006; G06T 3/4007; G06T 2207/10081; G06T 2207/20021; A61B 6/03
See application file for complete search history.

(56) References Cited

U.S. PATENT DOCUMENTS

| 7,693,318 | B1* | 4/2010 | Stalling | G06T 11/006 128/922 |
| 2005/0152590 | A1* | 7/2005 | Thieret | G06T 11/006 382/131 |
| 2008/0205729 | A1* | 8/2008 | Ziegler | G06T 11/006 382/131 |
| 2009/0202036 | A1* | 8/2009 | Ziegler | G06T 11/006 378/19 |
| 2014/0270440 | A1* | 9/2014 | Inglese | A61B 6/4241 382/131 |

FOREIGN PATENT DOCUMENTS

JP 5133690 B2 1/2013

* cited by examiner

*Primary Examiner* — Yon J Couso
(74) *Attorney, Agent, or Firm* — Canon U.S.A., Inc. IP Division

(57) ABSTRACT

Back projection voxels smaller in size than forward projection voxels are created. Back projection is performed by the use of computed pixel values and measured pixel values at intersection points between straight lines connecting an X-ray source with the centroids of the back projection voxels and an X-ray detection panel.

20 Claims, 11 Drawing Sheets

INFORMATION PROCESSING APPARATUS, IMAGE RECONSTRUCTION METHOD, AND COMPUTER-READABLE MEDIUM

BACKGROUND

Field of Art

The present disclosure relates to an information processing apparatus, an image reconstruction method, and a computer-readable medium, in particular ones suited for use in creation of a reconstructed image by a sequential image reconstruction method.

Description of the Related Art

For example, an X-ray computed tomography (CT) apparatus irradiates a target with X rays from a plurality of directions to create a plurality of X-ray projection images, and computes an X-ray-absorption coefficient inside the target from the plurality of X-ray projection images, and makes an image of their distribution. As an image reconstruction method, there is a method called sequential image reconstruction (or sequential approximate image reconstruction or the like), for example.

By the sequential image reconstruction method, first, an area where an image is to be reconstructed is divided into a plurality of voxels, and an initial image (initial values of the voxels (absorption coefficients)) is given and forward projection is performed. The ratio of a projection image obtained by the forward projection and a projection image detected by an X-ray detection panel through actual projection of X rays is subjected to back projection, and the values of voxels are repeatedly updated until a predetermined condition for completion of computation is satisfied. Japanese Patent No. 5133690 discloses a technique for back projection by such the sequential image reconstruction by which the projection image is interpolated based on the positions of the voxels and back projection is performed by the use of the interpolated projection image.

To obtain an image with few artifacts by the sequential image reconstruction method, it is important that a matrix indicative of forward projection and a matrix indicative of back projection are in a relationship of transposed matrix. It would be easy to satisfy this property when respective matrix elements can be stored in a storage device inside the apparatus. However, when the required size of a reconstructed image is large, the number of the matrix elements grows immensely, and storing those matrix elements in the storage device is not realistic in many cases.

In the computation on forward projection and the computation on back projection, it is not easy to create matrix elements as necessary and, at the same time, execute efficient parallel computation when the matrixes of forward projection and back projection are in the relationship of transposed matrix. This is because, when a computation method is set up such that either forward projection or back projection is suited to parallel computation, the efficiency of parallel computation is generally sacrificed in the other computation in which the other projection acts as a symmetric matrix. For example, when the computation for back projection corresponding to the transposed matrix in the ray-driven computation for forward projection is parallelized, atomic operation sacrificing parallelism is included.

Accordingly, in the reconstruction of a large-sized image, the computation on forward projection and the computation on back projection are executed in parallel by algorithms convenient to their parallel computation, and the relationship of transposed matrix between forward projection and back projection is abandoned in many cases.

SUMMARY

As described above, according to the conventional technique, there is a problem in that it is not easy to shorten the processing time and improve the accuracy of a reconstructed image in the case of performing the computation by the sequential image reconstruction method. An embodiment of the present invention is devised in light of the foregoing circumstances. An embodiment of the present invention may, in the reconstruction of an image by the sequential image reconstruction method, shorten the processing time, and improve the accuracy of the reconstructed image.

An information processing apparatus of an embodiment of the present invention is an information processing apparatus that performs a process for reconstructing an image in a reconstruction area by the use of pixel values based on radiation generated by a radiation source and detected by a detection unit, the apparatus including a forward projection unit that performs forward projection of a plurality of forward projection voxels set in the reconstruction area to create forward projection data and a back projection unit that performs back projection onto back projection voxels smaller in size than the forward projection voxels based on the forward projection data.

Further features of the present invention will become apparent from the following description of exemplary embodiments (with reference to the attached drawings).

DESCRIPTION OF THE EMBODIMENTS

Figure 1:
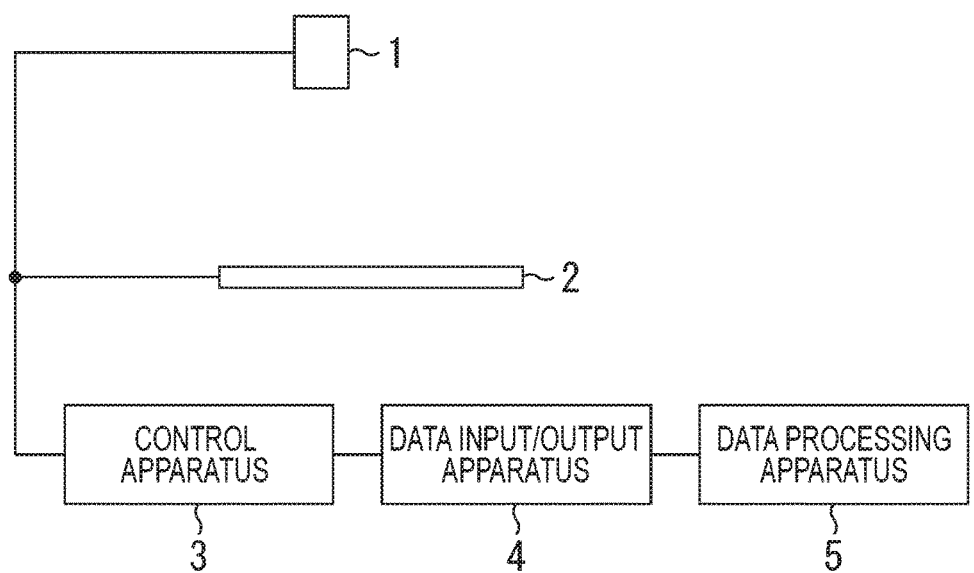
FIG. 1 is a diagram illustrating a configuration of a radiography system.

FIG. 1 is a diagram illustrating an example of configuration of a radiography system. An X-ray source 1 as an example of radiation source emits an X ray to an X-ray detection panel 2. The X ray emitted from the X-ray source 1 reaches the X-ray detection panel 2 (its detection surface) through a photographic subject on a stand. The X-ray detection panel 2 acquires X-ray projection image data of the photographic subject. The X-ray detection panel 2 has a plurality of pixels arranged in a two-dimensional matrix pattern, for example. The values of the pixels (pixel values) take values according to the intensity of the X ray. The X-ray imaging apparatus including the X-ray source 1 and the X-ray detection panel 2 may be a cone-beam CT apparatus, for example. However, the X-ray imaging apparatus may be any apparatus as far as it is configured to take an X-ray image and is capable of sequential image reconstruction. In addition, the reconstructed image may be a 2D image or a 3D image. The X-ray imaging apparatus as described above can be implemented by a publicly-known technique and detailed explanations thereof will be omitted here.

A control apparatus 3 controls the positions of the X-ray source 1 and the X-ray detection panel 2, provides an instruction for X-ray irradiation from the X-ray source 1, acquires X-ray projection image data obtained by the X-ray detection panel 2, and others. A data input/output apparatus 4 outputs the X-ray projection image data acquired by the control apparatus 3, and inputs an instruction from the user into the control apparatus 3, and others. A data processing apparatus 5 reconstructs the image of the photographic subject (for example, tomographic image) by the sequential image reconstruction method on the basis of the X-ray projection image data output from the data input/output apparatus 4.

Figure 2:
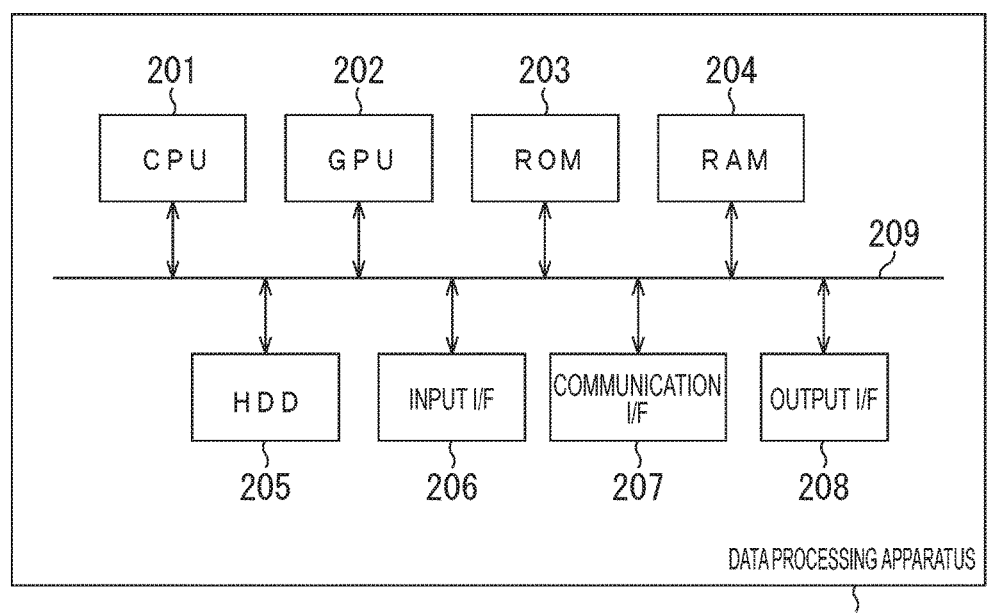
FIG. 2 is a diagram illustrating a configuration of hardware in a data processing apparatus.

FIG. 2 is a diagram illustrating a configuration of hardware in the data processing apparatus 5.

Referring to FIG. 2, the data processing apparatus 5 has a CPU 201, a GPU 202, a ROM 203, a RAM 204, an HDD 205, an input I/F 206, a communication I/F 207, an output I/F 208, and a bus 209.

The CPU 201 serves as an arithmetic operation unit and a control unit, and controls all or some of the operations in the data processing apparatus 5 according to various programs recorded in the ROM 203, the RAM 204, and the HDD 205.

The GPU 202 serves as an arithmetic operation unit and a control unit together with the CPU 201. The GPU 202 controls all or some of operations in the data processing apparatus 5 according to the various programs recorded in the ROM 203, the RAM 204, and the HDD 205. The GPU 202 has a plurality of processors and can perform parallel processing by the plurality of processors. In the embodiment, a case of performing parallel processing by the GPU 202 will be explained as an example.

The ROM 203 stores programs, arithmetic parameters, and others used by the CPU 201 or the GPU 202. The RAM 204 stores primarily the programs used by the CPU 201 or the GPU 202, the parameters varying as appropriate at execution of the programs, and others. The HDD 205 stores the programs and arithmetic parameters used by the CPU 201 or the GPU 202, and others. The program for executing the process described in the flowchart of FIG. 10 described later is stored in the ROM 203 or the HDD 205. In addition, the parameters necessary for executing the programs and the data on reconstructed images obtained by executing the programs are stored in the HDD 205.

The input I/F 206 is an interface for the user to input operations such as a mouse, a keyboard, a touch panel, buttons, switches, levers, and the like, for example. The information necessary for processing by the data processing apparatus 5 described later (the information to be preset) is input via the input I/F 206. The communication I/F 207 is an interface for transmitting and receiving data between the data processing apparatus 5 and an external apparatus connected to the data processing apparatus 5. The external apparatus is the data input/output apparatus 4, for example. Besides, data transmission and reception between the data processing apparatus 5 and an external apparatus connected to the data processing apparatus 5 via a network are carried out by the use of the communication I/F 207. The output I/F 208 is an interface for transmitting and receiving data between the data processing apparatus 5 and a peripheral device connected to the data processing apparatus 5. The peripheral device is a computer display, for example.

The foregoing apparatuses are connected to the bus 209 and can exchange data with one another via the bus 209.

The hardware in the data processing apparatus 5 can be implemented by hardware of a publicly-known information processing apparatus (a personal computer or the like) and is not limited to the configuration illustrated in FIG. 2. In addition, the processor performing parallel computation is not limited to the one with a GPU. For example, a processor performing parallel computation by operating a plurality of CPUs in parallel may be implemented.

In the embodiment, the data processing apparatus 5 derives an absorption coefficient $x_J$ of a voxel J basically according to the following equation (1). The reconstructed image (the image of the photographic subject) is created from the absorption coefficient $x_J$ of the voxel J.

[Equation 1]

$$x_J^{(k+1)} = \left( \frac{1}{C_J} \sum_i c_{iJ} \frac{y_i}{\sum_{J'} c_{iJ'} x_{J'}^{(k)}} \right) x_J^{(k)} \tag{1}$$

In the equation (1), k denotes the number of iterations, $c_{iJ}$ and $c_{iJ'}$ denote elements of a projection matrix indicative of weights to an X ray i on voxels J and J', and $y_i$ denotes the pixel value actually detected by the X-ray detection panel 2 upon receipt of the X ray i.

The data processing apparatus 5 performs a process of reconstructing an image in a reconstruction area by the use of the pixel values based on the X ray created by the X-ray source 1 as an example of radiation source and detected by the X-ray detection panel 2 as an example of detection unit. At this time, the data processing apparatus 5 performs forward projection processing and back projection processing. The forward projection processing is a process for forward-projecting a plurality of set forward projection voxels onto the reconstruction area to create forward projection data. The back projection processing is a process for back-projecting the forward projection data onto back projection voxels smaller in size than the forward projection voxels. An example of functions of the data processing apparatus 5 will be explained below.

Figure 3:
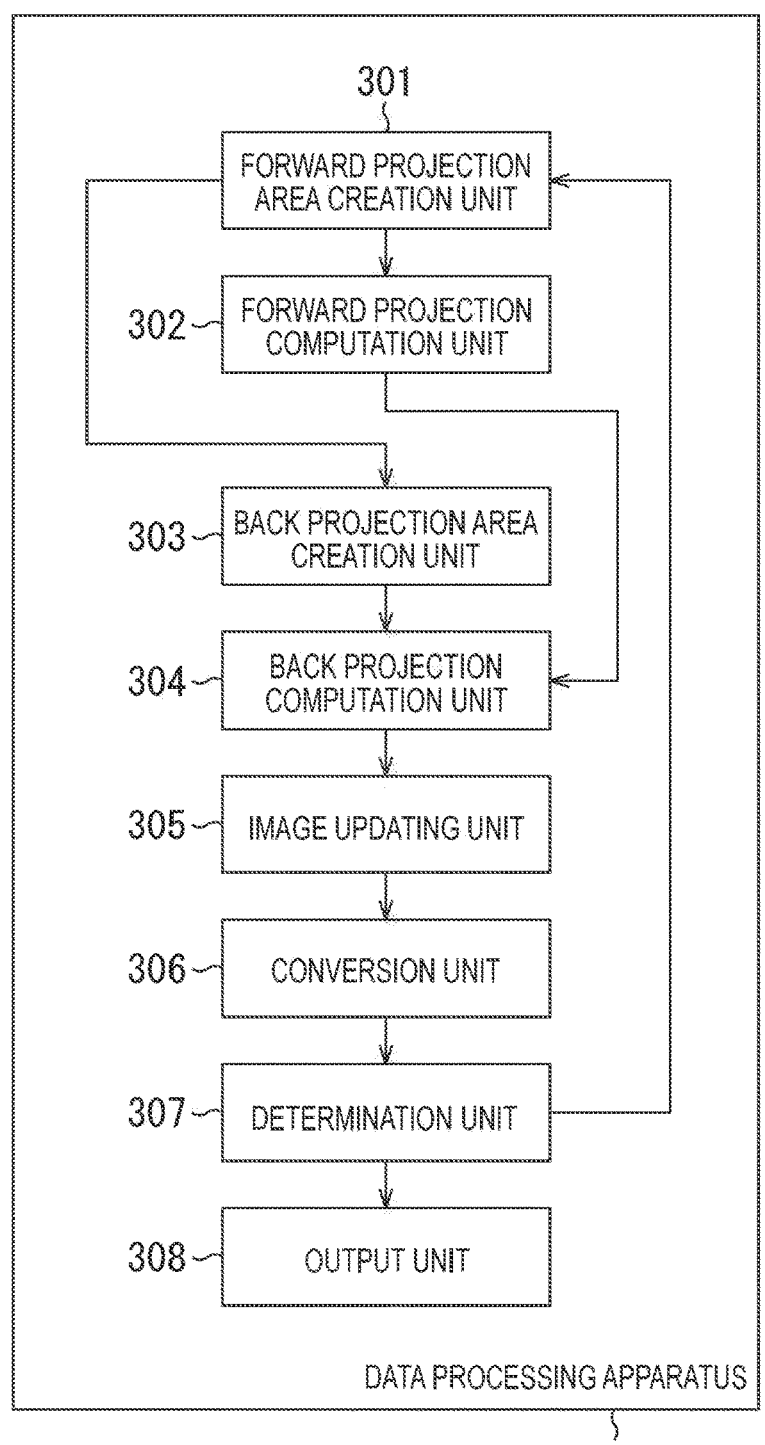
FIG. 3 is a diagram illustrating a functional configuration of the data processing apparatus.

FIG. 3 is a diagram illustrating a functional configuration of the data processing apparatus 5. An example of functions of the data processing apparatus 5 for creating a reconstructed image will be explained below.

A forward projection area creation unit 301 performs a first voxel creating process. Specifically, the forward projection area creation unit 301 divides an area of the image to be reconstructed into a plurality of voxels J'. In the following explanation, the area of the image to be reconstructed will be called reconstruction area as necessary. In the embodiment, for ease of explanation, the reconstruction area is a parallelepiped (more specifically, a rectangular parallelepiped or a cube). The voxels J' are parallelepipeds (more specifically, rectangular parallelepipeds or cubes) of the same size. In the following explanation, the voxels created by the forward projection area creation unit 301 will be called forward projection voxels as necessary.

Next, the forward projection area creation unit 301 gives initial values of absorption coefficients $x_{J'}$ of the forward projection voxels J' to the forward projection voxels J'. The initial values of absorption coefficients $x_{J'}$ of the forward projection voxels J' may be arbitrary values.

Figure 4:
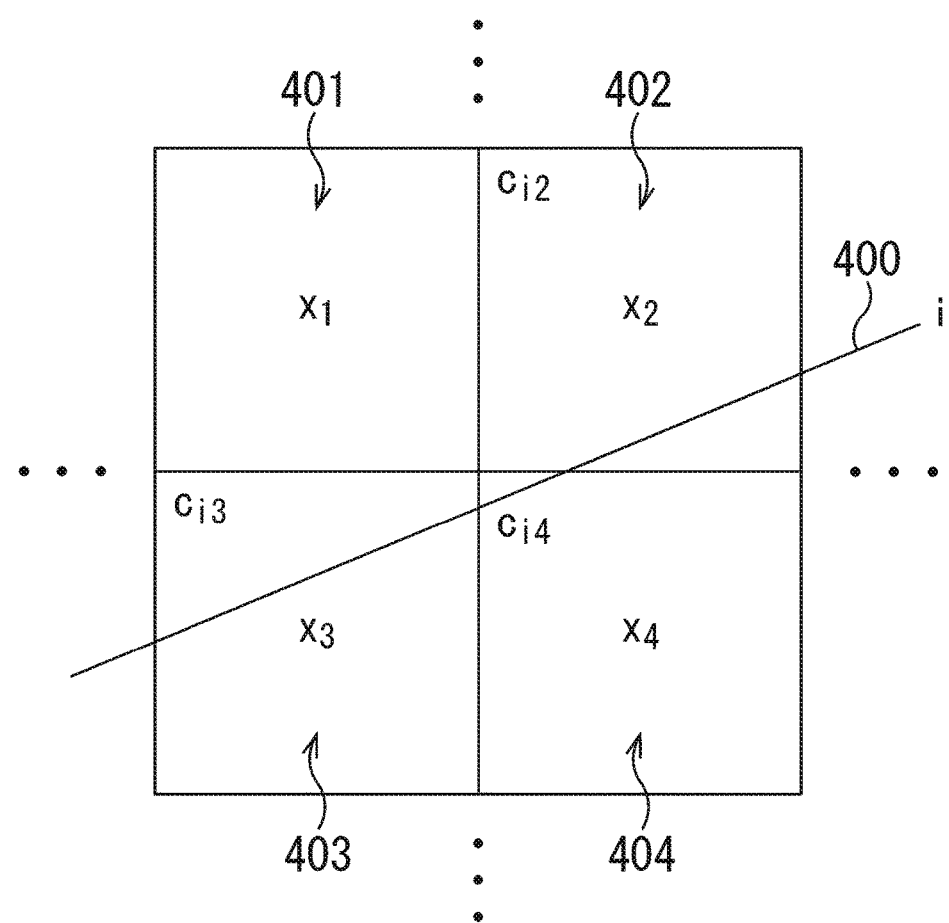
FIG. 4 is a diagram explaining a method of forward projection.

A forward projection computation unit 302 refers to the absorption coefficient $x_{J'}$ of the forward projection voxels J' to derive a projection image in the X-ray detection panel 2 (that is, performing forward projection). FIG. 4 is a diagram explaining a method of forward projection. FIG. 4 illustrates four forward projection voxels 401 to 404. FIG. 4 also describes the absorption coefficients of the four forward projection voxels 401 to 404 as $x_1$, $x_2$, $x_3$, and $x_4$, respectively.

A straight line connecting the X-ray source 1 (X-ray irradiation position) and a pixel (its center) in the X-ray detection panel 2 constitutes one direction of the X ray i. The forward projection computation unit 302 determines the projection voxels through which the X ray i on the straight line passes. In the example of FIG. 4, the forward projection voxels through which the X ray i on a straight line 400 passes are the forward projection voxels 402 to 404. Then, the forward projection computation unit 302 derives the lengths by which the X ray i on the straight line 400 passes through (crosses over) the forward projection voxels 402 to 404 as projection matrix elements $c_{i2}$, $c_{i3}$, and $c_{i4}$ in the forward projection voxels 402 to 404. Then, the forward projection computation unit 302 derives the total sum of values obtained by multiplying the absorption coefficients $x_2$, $x_3$, and $x_4$ of the forward projection voxels 402 to 404 by the elements $c_{i2}$, $c_{i3}$, and $c_{i4}$ of the projection matrix in the forward projection voxels 402 to 404. The total sum constitutes a pixel value $p_i$ (computed value) detected by the X-ray detection panel 2 from the X ray i on the straight line 400. That is, the forward projection computation unit 302 carries out a computation in the following equation (2) to derive the pixel value $p_i$ obtained by the X-ray detection panel 2 from the X ray i:

[Equation 2]

$$p_i = \sum_{J' \in S} c_{iJ'} x_{J'} \quad (2)$$

In the equation (2), S denotes an aggregation of identification numbers for the forward projection voxels through which the X ray i passes while the X-ray source 1 and the X-ray detection panel 2 rotate around the reconstruction area during image taking. The forward projection computation unit 302 carries out the computation in the equation (2) for at least two X rays i (straight lines connecting the X-ray source 1 and pixels of the X-ray detection panel 2) in parallel. The number of computations to be performed in parallel depends on the performance of the GPU 202 (the number of processors and the like).

Figure 5:
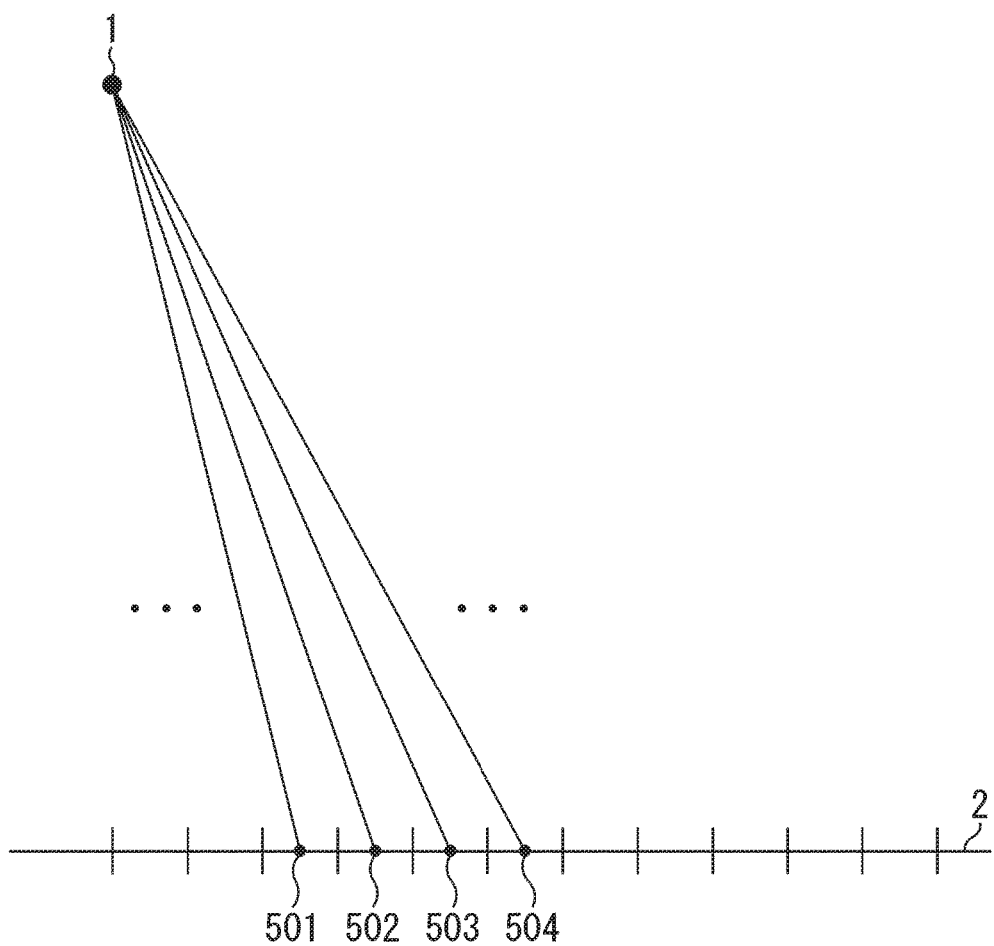
FIG. 5 is a diagram illustrating positions where pixel values are computed by forward projection.

FIG. 5 is a diagram illustrating positions where pixel values $p_i$ are computed by forward projection. As illustrated in FIG. 5, pixels values $p_1$ to $p_4$ are obtained at intersection points 501 to 504 between straight lines connecting the X-ray source 1 (the center of the X-ray irradiation start position) with four pixels (their centers) in the X-ray detection panel 2 and the X-ray detection panel 2 (its detection surface). Similarly, pixel values are obtained for the other pixels in the X-ray detection panel 2. These pixel values are computed in parallel.

A back projection area creation unit 303 performs a second voxel creating process. Specifically, the back projection area creation unit 303 creates a plurality of voxels J smaller in size than the forward projection voxels J' in the reconstruction area. In the following explanation, the voxels J created by the back projection area creation unit 303 will be called back projection voxels J. In the embodiment, the back projection area creation unit 303 creates the back projection voxels J by dividing each of the forward projection voxels J' into a plurality of portions by the same method.

Figure 6:
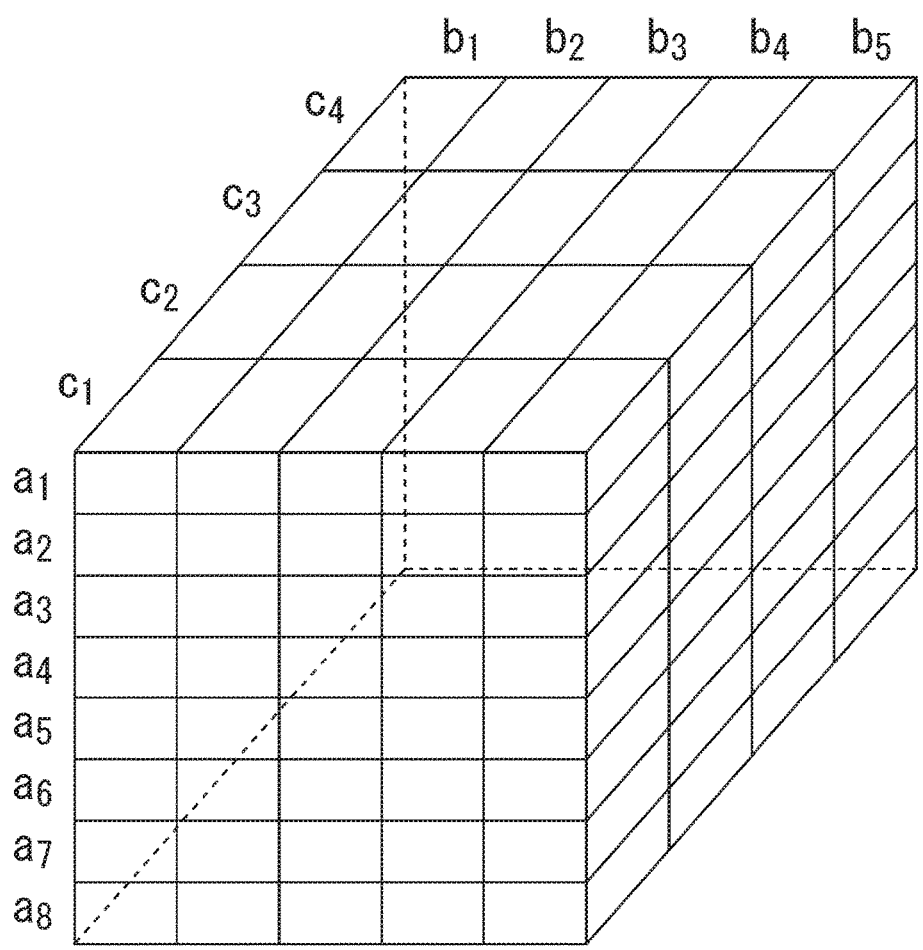
FIG. 6 is a diagram explaining a method of creating back projection voxels.

FIG. 6 is a diagram explaining a method of creating back projection voxels J. FIG. 6 illustrates conceptually the state in which the back projection voxels J are created from one forward projection voxel J'. FIG. 6 represents the case in which the forward projection voxel J' and the back projection voxels J are both rectangular parallelepipeds as an example.

The back projection area creation unit 303 sets division points at which four parallel sides of the forward projection voxel J' are each divided into n portions, and divides the forward projection voxel J' such that the division points are passed in the directions vertical to the sides. There are three sets of four parallel sides of the forward projection voxel J'. The back projection area creation unit 303 divides the forward projection voxel J' in such a manner as described above for each of the three sets. Accordingly, as illustrated in FIG. 6, the plurality of back projection voxels J is created by dividing the one forward projection voxel J'. In the example of FIG. 6, the four sides parallel in the height direction are divided into eight portions, the four sides parallel in the lateral direction are divided into five portions, and the four sides parallel in the depth direction are divided into four portions. Therefore, 160 (=8×5×4) back projection voxels J are created from the one forward projection voxel J'.

A back projection computation unit 304 refers to the pixel values $p_i$ computed by the forward projection computation unit 302 and the pixel values $y_i$ actually detected by the X-ray detection panel 2 to derive the absorption coefficients of the back projection voxels J (that is, performing back projection).

Figure 7:
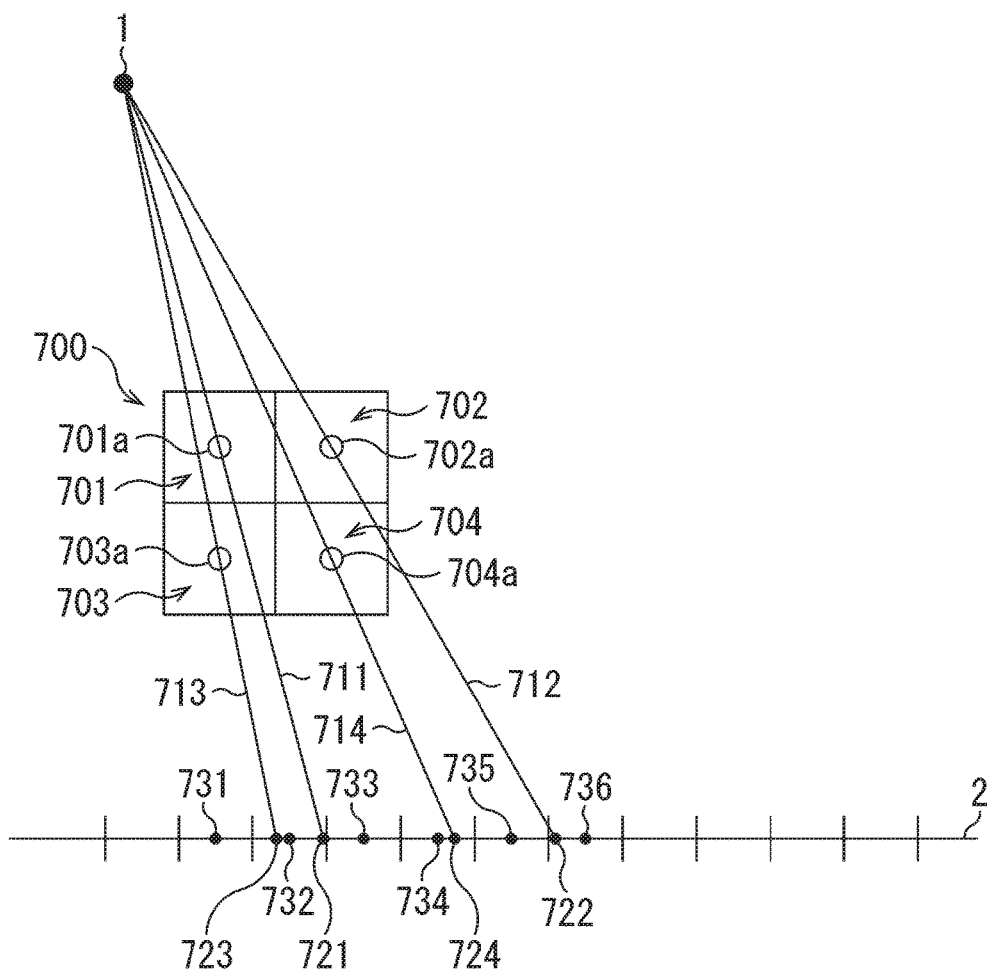
FIG. 7 is a diagram illustrating pixel values for use in back projection.

FIG. 7 is a diagram illustrating an example of pixel values for use in back projection. FIG. 7 illustrates four back projection voxels 701 to 704 out of the back projection voxels J in the reconstruction area, created by dividing one forward projection voxel 700.

Straight lines 711 to 714 connecting the X-ray source 1 (the center of the X-ray irradiation start position) with centroids 701a to 704a (centers) of the back projection voxels 701 to 704 constitute respective directions of the X ray i. The back projection computation unit 304 performs back projection by the use of the pixel values at intersection points 721 to 724 between the straight lines 711 to 714 and the X-ray detection panel 2 (its detection surface). That is, only one pixel value at one position is referred to in order to derive the absorption coefficient of one back projection voxel J.

As illustrated in FIG. 7, the intersection points 721 to 724 between the straight lines 711 to 714 and the X-ray detection panel 2 (detection surface) do not necessarily fall at centers 731 to 736 of pixels of the X-ray detection panel 2. Accordingly, in the embodiment, the back projection computation unit 304 derives the pixel values at the intersection points 721 to 724 by interpolating the pixel values at the centers 731 to 736 of the pixels around the intersection points. In the following description, the case of deriving the pixel values at the intersection points 721 to 724 by performing bilinear interpolation depending on the distances between the intersection points 721 to 724 and the centers 731 to 736 of the pixels around the intersection points will be explained as an example.

Figure 8:
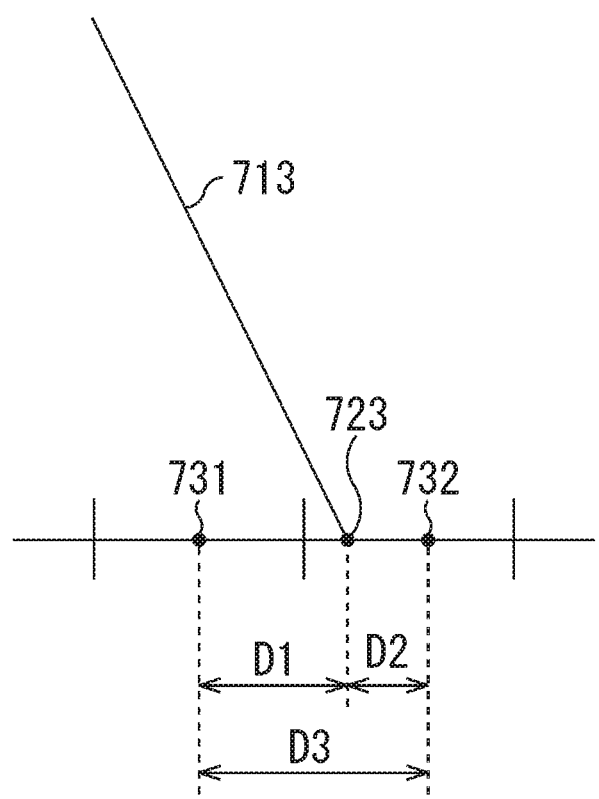
FIG. 8 is an enlarged partial view of FIG. 7.

FIG. 8 is an enlarged partial view of FIG. 7.

Referring to FIG. 8, the distances between the intersection point 723 and the centers 731 and 732 of the pixels around the intersection point 723 are set as D1 and D2, respectively. In addition, the pixel values at the centers 731 and 732 of the pixels around the intersection point are set as $v_1$ and $v_2$, respectively. Accordingly, pixel value V at the intersection point 723 is expressed by the following equation (3):

$$V=(D2 \times v_1 + D1 \times v_2)/D3 \quad (3)$$

The back projection computation unit 304 computes the foregoing pixel value V from each of the pixel value $p_i$ computed by the forward projection computation unit 302 and the pixel value $y_i$ actually detected by the X-ray detection panel 2. In the following explanation, the pixel value determined by the equation (3) from the pixel value $p_i$ computed by the forward projection computation unit 302 will be called computed pixel value as necessary. In addition, the pixel value determined by the equation (3) from the pixel value $y_i$ actually detected by the X-ray detection panel 2 will be called measured pixel value as necessary.

As illustrated in FIG. 8, the distances D1, D2, and D3 described above are determined at the intersection point 723. Therefore, the computed pixel value $P_1$ at the intersection point 723 is determined by the following equation (3a) from the pixel values $p_1$ and $P_2$ computed by the forward projection computation unit 302:

$$P_1=(D2 \times p_1 + D1 \times p_2)/D3 \quad (3a)$$

In addition, the measured pixel value $Y_1$ at the intersection point 723 is determined by the following equation (3b) from the pixel values $y_1$ and $y_2$ actually detected by the X-ray detection panel 2:

$$Y_1=(D2 \times y_1 + D1 \times y_2)/D3 \quad (3b)$$

Figure 9:
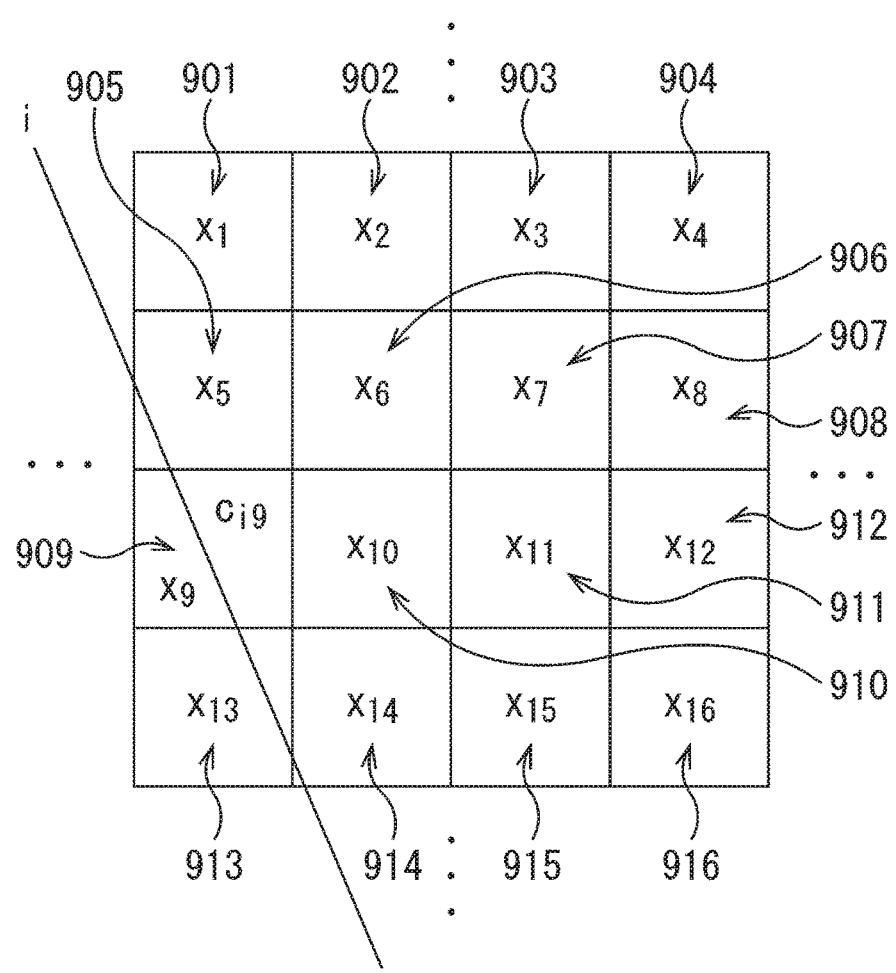
FIG. 9 is a diagram explaining an example of method of a back projection.

Referring to FIG. 7, the computed pixel values and the measured pixel values at the other intersection points 721 and 722 to 724 can also be determined in the same manner as the computed pixel value $P_1$ and the measured pixel value $Y_1$. FIG. 9 is a diagram explaining an example of a method of back projection. FIG. 9 illustrates 16 back projection voxels 901 to 916.

Of the back projection voxels, the back projection computation unit 304 determines the back projection pixels whose centroids are passed through by the X rays i (the straight lines 711 to 714 connecting the X-ray source 1 with the centroids 701a to 704a of the back projection voxels 701 to 704). In the example illustrated in FIG. 9, the X ray i passes through the centroid of the back projection voxel 909. The back projection computation unit 304 derives the length by which the X ray i passes through (crosses over) the determined back projection voxel 909 as an element $C_{i9}$ of the projection matrix in the back projection voxel 909. Then, the back projection computation unit 304 acquires the measured pixel value $Y_i$ and the computed pixel value $P_i$ at the intersection point between the X ray i and the X-ray detection panel 2 (its detection surface). Then, the back projection computation unit 304 derives the value obtained by multiplying the ratio of the computed pixel value $P_i$ to the measured pixel value $Y_i$ (=$P_i/Y_i$) by the projection matrix element $C_{i9}$ as absorption coefficient $x_J$ of the back projection voxel 909. That is, the back projection computation unit 304 derives the absorption coefficient $x_J$ of the back projection voxel J by carrying out a computation in the following equation (4):

$$x_J = \sum_{i \in T} c_{iJ} \frac{Y_i}{P_i} \quad (4)$$

In the equation (4), T denotes an aggregation of X rays i passing through the centroid of the back projection voxel J while the X-ray source 1 and the X-ray detection panel 2 rotate around the reconstruction area at the time of image taking. The back projection computation unit 304 derives the absorption coefficients $x_J$ of all the back projection voxels J in such a manner as described above. The back projection computation unit 304 carries out the computation in the equation (4) for at least two back projection voxels J in parallel. The number of computations performed in parallel (the number of the absorption coefficients $x_J$ of the back projection voxels J determined in parallel) depends on the performance of the GPU 202 (the number of processors and the like). To compute the absorption coefficients $x_J$ of the back projection voxels J, the back projection computation unit 304 secures memory areas necessary for the computation for the individual back projection voxels J.

An image updating unit 305 divides the absorption coefficient $x_J$ of the back projection voxel J by a coefficient $C_J$, and then multiplies the obtained value by final absorption coefficient $x_J^{(k)}$ of the back projection voxel J at the number of iterations k. The resulting value constitutes a final absorption coefficient $x_J^{(k+1)}$ of the back projection voxel J at the number of iterations k+1. The absorption coefficient $x_J$ of the back projection voxel J is computed by the back projection computation unit 304. The coefficient $C_J$ is intended to standardize the coefficient of the back projection voxel J. (Final) absorption coefficient $x_J^{(0)}$ of the back projection voxel J at the number of iterations k (=0) is given as an initial value. For example, the initial value of (final) absorption coefficient of the back projection voxel J can be obtained by multiplying the initial value of the absorption coefficient $x_{J'}$ of the forward projection voxel J' to which the back projection voxel J belongs by a weight coefficient of the back projection voxel J. The weight coefficient of the back projection voxel J can be the ratio of the cubic content of the back projection voxel J to the cubic content of the forward projection voxel J' to which the back projection voxel J belongs, for example.

The image updating unit 305 derives the final absorption coefficient $x_J^{(k+1)}$ of the back projection voxel J by performing the computations based on the foregoing equation (1) as described above. In the embodiment, the part in the parentheses on the right side of the equation (1) except for $1/C_J$ is replaced by the contents of the equation (4).

A conversion unit 306 converts the final absorption coefficient $x_J^{(k+1)}$ of the back projection voxel J updated by the image updating unit 305 into the absorption coefficient of the forward projection voxel J' to which the back projection voxel J belongs. For example, the conversion unit 306 can derive the total sum of values obtained by multiplying the final absorption coefficients $x_J^{(k+1)}$ of the back projection voxels J belonging to the forward projection voxel J' by the weight coefficients of the back projection voxels J as the absorption coefficient of the forward projection voxel J'. The weight coefficients of the back projection voxels J can be the ratios of the cubic contents of the back projection voxels J to the cubic content of the forward projection voxel J' to which the back projection voxels J belong. The conversion unit 306 refers to the final absorption coefficients $x_J^{(k+1)}$ of the back projection voxels J belonging to the forward projection voxel J' to derive the absorption coefficient of the forward projection voxel J', and releases the memory areas secured for deriving the absorption coefficients of the back projection voxels J.

A determination unit 307 determines whether to terminate the computation of the absorption coefficient $x_J^{(k+1)}$ of the back projection voxel J. For example, when the total sum of absolute values of differences between the absorption coefficients $x_J^{(k)}$ and $x_J^{(k+1)}$ of the back projection voxel J at the numbers of iterations k and k+1 is equal to or smaller than a threshold, the determination unit 307 determines to terminate the computation of the absorption coefficient $x_J^{(k+1)}$ of the back projection voxel J. Alternatively, the determination unit 307 may determine to terminate the computation of the absorption coefficient $x_J^{(k+1)}$ of the back projection voxel J when a predetermined number of iterations is passed.

When the determination unit 307 determines not to terminate the computation of the absorption coefficient $x_J^{(k+1)}$ of the back projection voxel J as described above, the forward projection computation unit 302 performs the following process. That is, the forward projection computation unit 302 updates the current value of the forward projection voxel J' to the latest absorption coefficient of the forward projection voxel J' derived by the conversion unit 306. Then, the forward projection area creation unit 301 to the determination unit 307 perform their processes with the use of the updated absorption coefficient of the forward projection voxel J'. This processing is performed until the determination unit 307 determines to terminate the computation of the absorption coefficient $x_J^{(k+1)}$ of the back projection voxel J.

When the determination unit 307 determines to terminate the computation of the absorption coefficient $x_J^{(k+1)}$ of the back projection voxel J, an output unit 308 stores the latest absorption coefficient of the forward projection voxel J' derived by the conversion unit 306 as data of the reconstructed image. Then, the output unit 308 creates display data of the reconstructed image on the basis of the data of the reconstructed image and displays the reconstructed image on a computer display. Besides, the output unit 308 may transmit the data of the reconstructed image to an external device.

The output unit 308 may display the reconstructed image on the computer display each time the absorption coefficient of the forward projection voxel J' is obtained from the conversion unit 306, regardless of the result of determination by the determination unit 307. In this case, the determination unit 307 may determine whether to terminate the computation of the absorption coefficient $x_J^{(k+1)}$ of the back projection voxel J on the basis of the result of the user operation on the reconstructed image displayed on the computer display.

Figure 10:
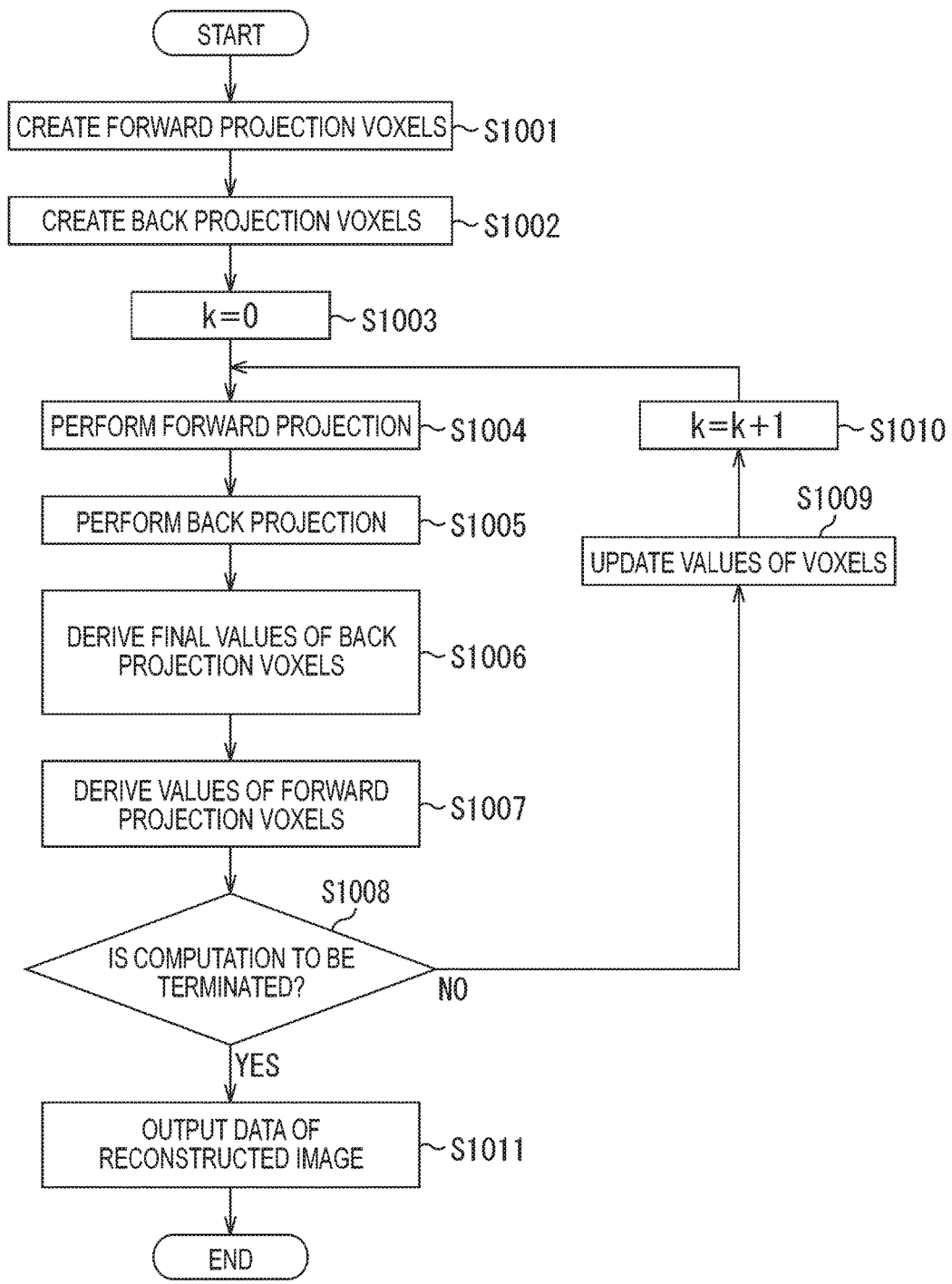
FIG. 10 is a flowchart explaining a process by a data processing apparatus.

Next, an example of processing by the data processing apparatus 5 will be explained with reference to the flowchart of FIG. 10.

At step S1001, the forward projection area creation unit 301 divides the reconstruction area into a plurality of portions to create a plurality of forward projection voxels J'. Then, the forward projection area creation unit 301 sets initial values to the plurality of forward projection voxels J'.

Next, at step S1002, the back projection area creation unit 303 creates back projection voxels J smaller in size than the forward projection voxels J' in the reconstruction area (see FIG. 6 and the like).

Next, at step S1003, the forward projection computation unit 302 sets the number of iterations k to zero.

Next, at step S1004, the forward projection computation unit 302 performs forward projection. Specifically, the forward projection computation unit 302 performs the computation in the equation (2) to derive the pixel value $p_i$ (computed value) obtained by the X-ray detection panel 2 from the X ray i. As described above, the forward projection computation unit 302 derives the pixel values $p_i$ in parallel for a plurality of X rays i.

Next, at step S1005, the back projection computation unit 304 performs back projection. Specifically, the back projection computation unit 304 derives the computed pixel values $P_i$, from the pixel values $p_i$ obtained at step S1004, at intersection points on the X-ray detection panel 2 between the straight lines connecting the X-ray source 1 with the centroids of the back projection voxels J (see the equation (3a), FIGS. 7 and 8, and the like). In addition, the back projection computation unit 304 derives the measured pixel values $Y_i$ at the intersection points on the X-ray detection panel 2 between the straight lines connecting the X-ray source 1 with the centroid of the back projection voxel J (see the equation (3b), FIGS. 7 and 8, and the like). Then, the back projection computation unit 304 carries out the computation in the equation (4) to derive the absorption coefficients $x_J$ of the back projection voxels J. As described above, the back projection computation unit 304 derives the absorption coefficients $x_J$ in parallel for the plurality of back projection voxels J.

Next, at step S1006, the image updating unit 305 derives the final absorption coefficient $x_J^{(k+1)}$ of the back projection voxels J by the use of the absorption coefficients $x_J$ of the back projection voxels J derived at step S1005 (see the equations (1) and (4), and the like).

Next, at step S1007, the conversion unit 306 converts the final absorption coefficient $x_J^{(k+1)}$ of the back projection voxel J derived at step S1006 into the absorption coefficient of the forward projection voxel J' to which the back projection voxel J belongs.

Next, at step S1008, it is determined whether to terminate the computation of the absorption coefficient $x_J^{(k+1)}$ of the back projection voxel J. As a result of the determination, when it is not to terminate the computation of the absorption coefficient $x_J^{(k+1)}$ of the back projection voxel J, the process moves to step S1009.

At step S1009, the forward projection computation unit 302 updates the current value of the forward projection voxel J' to the latest absorption coefficient of the forward projection voxel J' derived at step S1007. Then, the process moves to step S1010, and the forward projection computation unit 302 adds 1 to the number of iterations k. Afterwards, step S1004 and the subsequent steps are performed with the use of the absorption coefficient of the forward projection voxel J' updated at step S1009. In this manner, at step S1008, steps S1004 to S1010 are repeatedly performed until it is determined to terminate the computation of the absorption coefficient $x_J^{(k+1)}$ of the back projection voxel J.

When it is determined at step S1008 to terminate the computation of the absorption coefficient $x_J^{(k+1)}$ of the back projection voxel J, the process moves to step S1011. At step S1011, the output unit 308 stores the latest value of the forward projection voxel J' derived at step S1007 as data of the reconstructed image. Then, the output unit 308 processes the data of the reconstructed image to data suited to the apparatus as the destination of the data and outputs the same. Then, the process according to the flowchart of FIG. 10 is terminated.

In the embodiment as described above, the back projection voxels J smaller in size than the forward projection voxels J' are created. Back projection is performed by the use of the computed pixel values $P_i$ and the measured pixel values $Y_i$ at the intersection points 721 to 724 between the straight lines connecting the X-ray source 1 with the centroids of the back projection voxels J and the X-ray detection panel 2. Therefore, it is possible to suppress missing of information on projection image at the time of back projection and perform appropriate parallel computation. Accordingly, in reconstructing the image by the sequential image reconstruction method, it is possible to achieve both shortened processing time and improved image accuracy. In addition, it is possible to suppress artifacts in the reconstructed image caused by mismatching of forward projection and back projection, and suppress increase in the capacity of the used internal storage device, thereby reducing the memory capacity for use in reconstruction processing.

In the embodiment, the forward projection voxels are divided into back projection voxels as an example. However, when the size of the back projection voxels is made smaller than the forward projection voxels, it is not necessarily required to create the back projection voxels by dividing the forward projection voxels. For example, the reconstruction area may be divided regardless of the forward projection voxels to create the back projection voxels smaller in size than the forward projection voxels.

In addition, in the embodiment explained above, the shape of the forward projection voxels and the back projection voxels is parallelepiped as an example. However, the shape of the forward projection voxels and the back projection voxels is not limited to being parallelepiped. To reconstruct a 3D image, an arbitrary solid shape can be employed for the shape of the forward projection voxels and the back projection voxels. To reconstruct a 2D image, an arbitrary plane shape can be employed for the shape of the forward projection voxels and the back projection voxels. In addition, the forward projection voxels and the back projection voxels may be different in shape.

Figure 11A:
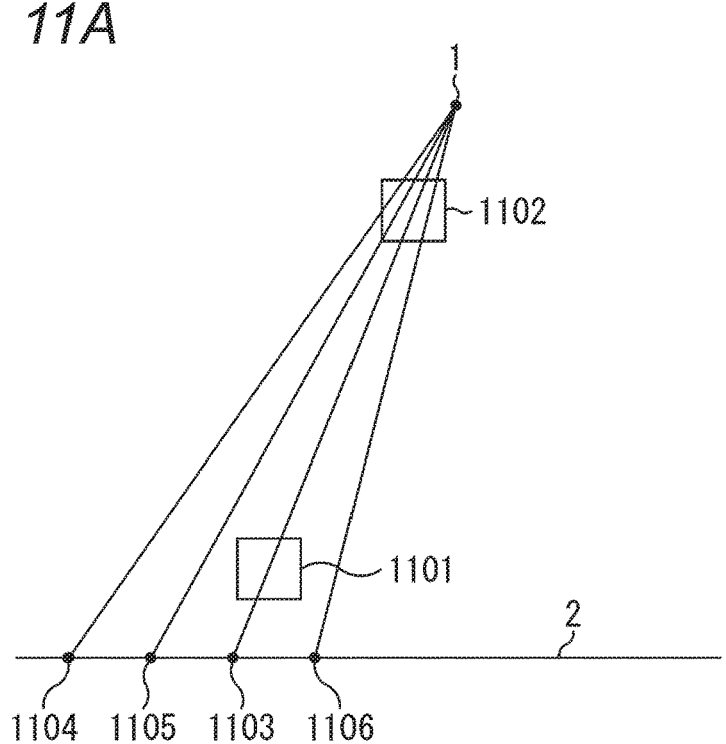
FIGS. 11A and 11B are diagrams illustrating variation examples of a setting method of voxels for back projection.
Figure 11B:
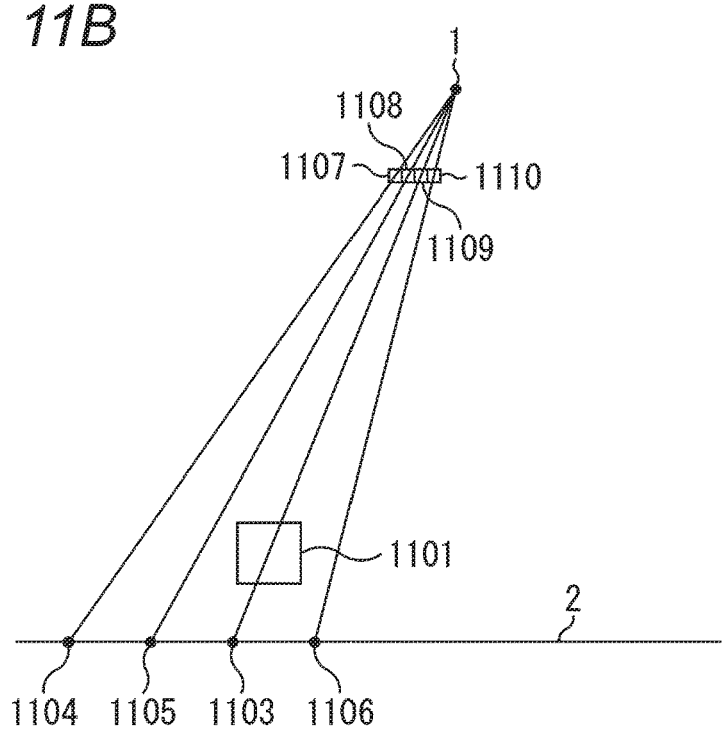

In addition, in the embodiment explained above, the back projection voxels are the same in size as an example. However, the back projection voxels are preferably different in size according to the distance from the X-ray source 1. FIGS. 11A and 11B are diagrams illustrating variation examples of a method of setting the back projection voxels. Specifically, FIG. 11A is a diagram illustrating pixel values taken into the back projection voxels of the same size. FIG. 11B is a diagram illustrating an example of pixel values taken into the back projection voxels different in size according to the distance from the X-ray source 1.

As illustrated in FIGS. 11A and 11B, the irradiation range of the X ray becomes wider in areas at larger distances from the X-ray source 1. In addition, in the embodiment, back projection is performed by the use of the pixel values at the intersection points between the straight lines connecting the X-ray source 1 with the centroids of the back projection voxels and the X-ray detection panel 2. Therefore, as illustrated in FIGS. 11A and 11B, it is possible to suppress missing of the pixel values of the X-ray detection panel 2 in the area distant from the X-ray source 1 even with the use of a relatively large back projection voxels 1101.

In contrast, as illustrated in FIG. 11A, when a back projection voxel 1102 of the same size as that of the back projection voxel in an area distant from the X-ray source 1 is used in the area close to the X-ray source 1, the following result is obtained. That is, in the area of the back projection voxel 1102, the pixel value at an intersection point 1103 is reflected on the absorption coefficient of the back projection voxel 1102 but the pixel values at intersection points 1104 to 1106 are not reflected on the absorption coefficient of the back projection voxel 1102.

Meanwhile, as illustrated in FIG. 11B, creating small back projection voxels 1107 to 1110 in an area close to the X-ray source 1 allows the pixel values at the intersection points 1103 to 1106 to be reflected on the absorption coefficients of the back projection voxels 1107 to 1110.

As described above, it is preferred that the back projection voxels are made smaller in areas at shorter distances from the X-ray source 1. However, it is not necessarily required to do this in the entire reconstruction area. For example, this may be done only in part of the reconstruction area depending on the arrangement of the X-ray source 1 and the X-ray detection panel 2, the required accuracy of the reconstructed image, and the like. That is, (at least one) back projection voxel smaller in size than the back projection voxels in the areas at relatively long distances from the X-ray source 1 needs to be in the area relatively at a short distance from the X-ray source 1.

In addition, in the embodiment, back projection is performed by the use of the computed pixel values $P_i$ and the measured pixel values $Y_i$ at the intersection points 721 to 724 between the straight lines connecting the X-ray source 1 with the centroids of the back projection voxels J and the X-ray detection panel 2 as an example. However, it is not necessarily required to use the centroids of the back projection voxels J as far as arbitrary points in the back projection voxels J are used as representative points.

The foregoing embodiment is a mere exemplification for carrying out the present invention. The technical scope of the present invention should not be interpreted in a limited way. That is, the present invention can be carried out in various manners without deviating from its technical ideas or major features.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-236712, filed Dec. 3, 2015, which is hereby incorporated by reference herein in its entirety.

What is claimed is:

1. An information processing apparatus that performs a process for reconstructing an image in a reconstruction area by the use of pixel values based on radiation generated by a radiation source and detected by a detection unit, the apparatus comprising:
a memory storing a program; and
one or more processors which, by executing the program, function as:
a forward projection area creation unit configured to divide the reconstruction area into a plurality of forward projection voxels to create forward projection data;
a forward projection unit configured to perform forward projection of the plurality of forward projection voxels created by the forward projection area creation unit in the reconstruction area;
a back projection area creation unit configured to create a plurality of back projection voxels smaller in size than the forward projection voxels in the reconstruction area; and
a back projection unit configured to perform back projection onto the plurality of back projection voxels created by the back projection area creation unit based on the forward projection data.

2. The information processing apparatus according to claim 1, wherein the back projection voxel smaller in size than the back projection voxel in an area relatively distant from the radiation source is in an area relatively close to the radiation source.

3. The information processing apparatus according to claim 1, wherein the forward projection voxels are divided into a plurality of portions to create the back projection voxels.

4. The information processing apparatus according to claim 1, wherein
the forward projection unit creates the plurality of forward projection voxels in the reconstruction area, and, for radiation rays on straight lines connecting the radiation source with a plurality of pixels detecting the radiation rays, derives pixel values of the pixels in parallel by the use of absorption coefficients set to the forward projection voxels and weights of the forward projection voxels relative to the straight lines, and
the back projection unit creates the plurality of back projection voxels in the reconstruction area, and, for radiation rays on straight lines connecting the radiation source with a plurality of representative points in the plurality of back projection voxels, derives absorption coefficients of the back projection voxels in parallel by the use of the pixel values of the pixels derived by the forward projection unit, the pixel values of the pixels detected by the detection unit, and weights of the back projection voxels relative to the straight lines.

5. The information processing apparatus according to claim 4, wherein the back projection unit derives the pixel values at intersection points between the straight lines connecting the radiation source with the representative points in the back projection voxels and a detection surface of the detection unit by interpolating the pixel values of the pixels derived by the forward projection unit and the pixel values of the pixels detected by the detection unit, and derives the absorption coefficients of the back projection voxels by the use of the derived pixel values.

6. The information processing apparatus according to claim 4, wherein
the weights of the forward projection voxels relative to the straight lines are represented by lengths by which the straight lines pass through the forward projection voxels, and
the weights of the back projection voxels relative to the straight lines are represented by lengths by which the straight lines pass through the back projection voxels.

7. The information processing apparatus according to claim 3, further comprising an updating unit configured to update the absorption coefficients of the forward projection voxels by deriving the absorption coefficients of the forward projection voxels by the use of the absorption coefficients of the back projection voxels derived by the back projection unit, the size of the back projection voxels, and the size of the forward projection voxels.

8. The information processing apparatus according to claim 7, wherein
at the time of derivation of the absorption coefficients of the back projection voxels, the back projection unit secures memory areas for deriving the absorption coefficients of the back projection voxels, and
at the time of derivation of the absorption coefficients of the forward projection voxels, the updating unit releases the memory areas secured for deriving the absorption coefficients after making reference to the absorption coefficients of the back projection voxels belonging to the forward projection voxels.

9. An image reconstructing method by which to perform a process for reconstructing an image in a reconstruction area by the use of pixel values based on radiation generated by a radiation source and detected by a detection unit, the method comprising:
a forward projection area creation step to divide the reconstruction area into a plurality of forward projection voxels to create forward projection data;
forward projection step of creating forward projection data by performing forward projection of the plurality of forward projection voxels created by the forward projection area creation step in the reconstruction area;
a back projection area creation step to create a plurality of back projection voxels smaller in size than the forward projection voxels in the reconstruction area; and
a back projection step of performing back projection onto the plurality of back projection voxels created by the back projection area creation step based on the forward projection data.

10. A non-transitory computer-readable medium containing a program causing a computer to serve as a unit of an information processing apparatus that performs a process for reconstructing an image in a reconstruction area by the use of pixel values based on radiation generated by a radiation source and detected by a detection unit, the program comprising:
instructions to create forward projection data by dividing the reconstruction area into a plurality of forward projection voxels to create forward projection data;
instructions to create forward projection data by performing forward projection of the plurality of forward projection voxels created by the create forward projection data in the reconstruction area;
instructions to create a plurality of back projection voxels smaller in size than the forward projection voxels in the reconstruction area; and
instructions to perform back projection onto the plurality of back projection voxels created by the create the plurality of back projection voxels based on the forward projection data.

11. The image reconstructing method according to claim 9, wherein the back projection voxel smaller in size than the back projection voxel in an area relatively distant from the radiation source is in an area relatively close to the radiation source.

12. The image reconstructing method according to claim 9, wherein the forward projection voxels are divided into a plurality of portions to create the back projection voxels.

13. The image reconstructing method according to claim 9, wherein
the forward projection creates the plurality of forward projection voxels in the reconstruction area, and, for radiation rays on straight lines connecting the radiation source with a plurality of pixels detecting the radiation rays, derives pixel values of the pixels in parallel by the use of absorption coefficients set to the forward projection voxels and weights of the forward projection voxels relative to the straight lines, and
the performing back projection creates the plurality of back projection voxels in the reconstruction area, and, for radiation rays on straight lines connecting the radiation source with a plurality of representative points in the plurality of back projection voxels, derives absorption coefficients of the back projection voxels in parallel by the use of the pixel values of the pixels derived by the forward projection step, the pixel values of the pixels detected by the detection unit, and weights of the back projection voxels relative to the straight lines.

14. The image reconstructing method according to claim 13, wherein the back projection derives the pixel values at intersection points between the straight lines connecting the radiation source with the representative points in the back projection voxels and a detection surface of the detection unit by interpolating the pixel values of the pixels derived by the forward projection step and the pixel values of the pixels detected by the detection unit, and derives the absorption coefficients of the back projection voxels by the use of the derived pixel values.

15. The image reconstructing method according to claim 12, further comprising an updating step to update the absorption coefficients of the forward projection voxels by deriving the absorption coefficients of the forward projection voxels by the use of the absorption coefficients of the back projection voxels derived by the back projection step, the size of the back projection voxels, and the size of the forward projection voxels.

16. The non-transitory computer-readable medium according to claim 10, wherein the back projection voxel smaller in size than the back projection voxel in an area relatively distant from the radiation source is in an area relatively close to the radiation source.

17. The non-transitory computer-readable medium according to claim 10, wherein the forward projection voxels are divided into a plurality of portions to create the back projection voxels.

18. The non-transitory computer-readable medium according to claim 10, wherein
the forward projection step creates the plurality of forward projection voxels in the reconstruction area, and, for radiation rays on straight lines connecting the radiation source with a plurality of pixels detecting the radiation rays, derives pixel values of the pixels in parallel by the use of absorption coefficients set to the forward projection voxels and weights of the forward projection voxels relative to the straight lines, and
the performing back projection step creates the plurality of back projection voxels in the reconstruction area, and, for radiation rays on straight lines connecting the radiation source with a plurality of representative points in the plurality of back projection voxels, derives absorption coefficients of the back projection voxels in parallel by the use of the pixel values of the pixels derived by the forward projection step, the pixel values of the pixels detected by the detection unit, and weights of the back projection voxels relative to the straight lines.

19. The non-transitory computer-readable medium according to claim 18, wherein the back projection step derives the pixel values at intersection points between the straight lines connecting the radiation source with the representative points in the back projection voxels and a detection surface of the detection unit by interpolating the pixel values of the pixels derived by the forward projection step and the pixel values of the pixels detected by the detection unit, and derives the absorption coefficients of the back projection voxels by the use of the derived pixel values.

20. The non-transitory computer-readable medium according to claim 17, further comprising instructions to update the absorption coefficients of the forward projection voxels by deriving the absorption coefficients of the forward projection voxels by the use of the absorption coefficients of the back projection voxels derived by the back projection step, the size of the back projection voxels, and the size of the forward projection voxels.

* * * * *